Figure 1:
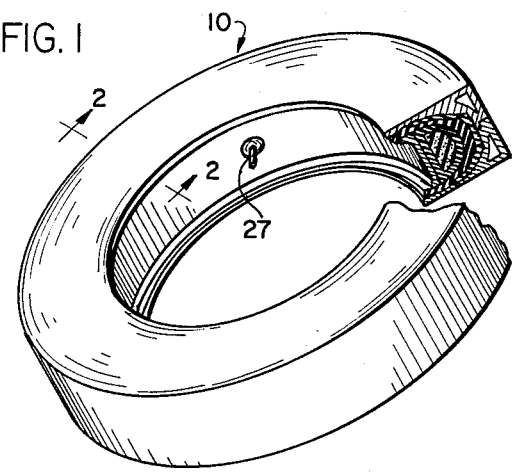

July 13, 1965 R. R. POLLOCK 3,193,882
INSULATING CORE FOR TIRE RECAPPING
Filed May 3, 1962

INVENTOR
RANDOLPH R. POLLOCK
BY
*A. Yates Dowell I & II*
ATTORNEY

United States Patent Office 3,193,882
Patented July 13, 1965

3,193,882
INSULATING CORE FOR TIRE RECAPPING
Randolph R. Pollock, 1103 N. Locust Ave.,
Lawrenceburg, Tenn.
Filed May 3, 1962, Ser. No. 192,260
4 Claims. (Cl. 18—38)

This invention relates to fluid pressure retaining devices, to the repair as well as the production of such devices, and to apparatus or equipment by which the repair as well as the manufacture of such devices is accomplished.

The invention relates particularly to operations which involve the utilization of a vulcanizable substance and the subjection of the same to heat as well as to retain such heat in the repair and recapping of pneumatic tires including those used for automobiles.

Numerous problems have been encountered in the repair and recapping of pneumatic tires used on automobiles and the like including difficulty of providing and maintaining adequate heat due to the loss or dissipation of such heat to cold cores and other equipment, and efforts have been made to overcome these difficulties by the use of heat wires and the like but the result has fallen short of the desired end.

It is an object of the invention to provide apparatus for use in the vulcanization of fluid pressure retaining devices including pneumatic tires and the like, and which apparatus comprises among other things a curing tube which may be applied to the interior of the tire or other device in the vulcanizing process and which curing tube includes insulation for preventing heat transfer and resultant loss of heat, and which insulation may be within the wall of the curing tube or may be included in the interior or on the exterior in a position to form a barrier against the transfer of heat.

Another object of the invention is to provide a simple and inexpensive curing tube or bag which can be readily produced to serve the function desired, but which will not interfere with the normal inflation and deflation processes during the operation as well as an insulating element which will occupy the same width and shape and occupy the same relative position in the tire and against the outer peripheral wall of the tube as a recap of the tire, and if desired the insulation may be attached or unattached to the tube to be handled as individual or multiple units.

A further object of the invention is to provide a curing tube filled with a resilient cellular insulating material which provides a barrier against the transfer of heat and which completely fills such curing tube whether the tube is under pressure or not.

A still further object of the invention is to provide a curing tube filled with a resilient cellular insulating material which provides a barrier against the transfer of heat and which will support the walls of a tire casing within a mold prior to the application of fluid under pressure to the curing tube to maintain the camelback cap being vulcanized to the casing in alignment with the tread design of the mold.

Figure 3:
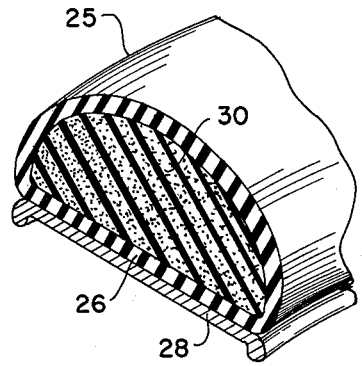
Figure 2:
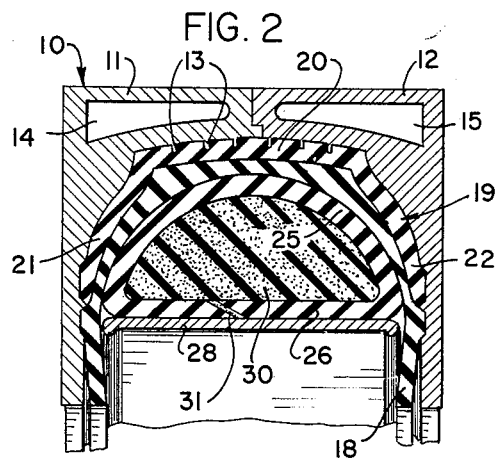
Figure 4:
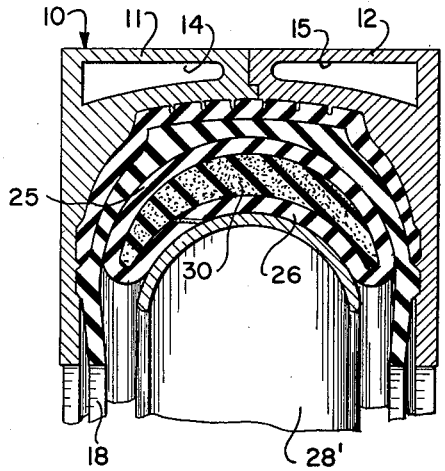
Figure 5:
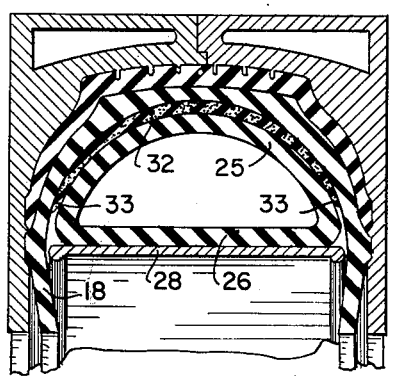

Other objects and advantages of the invention will be apparent from the following description taken in conjunction with the accompanying drawings wherein:

FIG. 1 is a perspective illustrating one application of the invention applied to a tire casing within a matrix;

FIG. 2, an enlarged fragmentary section on the line 2—2 of FIG. 1;

FIG. 3, a fragmentary perspective of the invention per se;

FIG. 4, a section similar to FIG. 2 of a slightly modified form of the invention; and FIG. 5, a section similar to FIG. 2 of a further modified form of the invention.

Briefly stated, the present invention comprises a curing tube or core utilized in the recapping of pneumatic tires and the like with such tube having a flat or concave surface which rests against a rigid rim so that air under pressure may be introduced into the curing tube to apply pressure outwardly to the interior of the tire to expedite the vulcanizing process, the curing tube or core including heat insulating material to prevent the transfer of heat from a matrix through both the tire casing and curing tube to the rim, where it is dissipated into the surrounding atmosphere, such insulating material being located either within the curing tube cavity or bonded to the exterior of such curing tube in a position to form a barrier against the transfer of heat.

With continued reference to the drawing, a split mold or matrix 10 is provided, having portions 11 and 12 adapted to be connected together in any conventional manner. Such mold portions are provided with inwardly projecting ribs or portions 13 which form the complementary tread design in the finished tire. Live steam or other form of heat is adapted to be applied to the matrix and distributed therethrough by channels 14 and 15. Although the drawing illustrates the use of steam heating, it will be apparent that the supply of heat may be furnished by electrical or other means to perform the vulcanizing operation.

In the recapping of tires, a tire casing 18 is buffed to remove all traces of the previous tread from the crown portion and to provide a roughened surface to which a camelback or the like cap 19 can be permanently bonded and vulcanized. The camelback cap 19 comprises a strip of uncured rubber and includes a relatively thick central portion 20 in which the tire tread design is formed and a pair of relatively thin tapered wing portions 21 and 22 located along the upper side of the tire casing 18. In order to vulcanize the camelback cap to the tire casing, the casing with the cap applied is placed in one of the mold portions of the matrix and thereafter the other mold portion is placed on the first mold portion and connected thereto.

To form a more substantial bond, a generally semi-cylindrical curing tube or core 25 having a flattened portion 26 is inserted within the tire casing and air under pressure is introduced into the tube 25 through an air valve 27. Upon the introduction of air the curing tube expands to apply pressure against the interior of the tire casing to seal such casing against mold portions 11 and 12. An annular rim 28 of metal or other rigid material is placed against the flattened portion 26 of the curing tube to cause all movement of the tube to be outwardly against the tire casing.

During the normal vulcanizing operation the heat from the matrix radiates, escapes or dissipates to the atmosphere through the curing tube 25 and the rim 28 which is in heat exchange relationship with the surrounding atmosphere. Due to the loss of heat, the tire casing 18 and the camelback cap 19 must be subjected to heat over an extensive period of time in order to cure the thicker portions of the camelback cap. When the relatively thin wings 21 and 22 of the cap are heated over a similar period of time they become over-cured and cause blisters, cracking, or otherwise weaken the bond.

In order to substantially delay the transfer of heat through the curing tube 25, the present invention contemplates the addition of a porous heat insulation. As illustrated in FIGS. 1–4, the insulation of cellular construction, such as foam rubber, Fiberglas wool or the like is disposed within the curing tube 25 to form a core 30 which provides a barrier against the transfer of heat.

The core 30 may be inserted within the curing tube 25 by cutting the flattened portion 26, preferably on an angle, inserting the core and then applying an adhesive 31 for sealing the tube to maintain the airtight integrity thereof. The core 30 is of sufficient porosity to permit air under pressure to force the tube 25 into intimate engagement with the tire casing 18.

The material of the cellular insulating core 30 is preferably compressed and fills the interior of the curing tube when such tube is not under pressure. When pressure is applied to the curing tube, the tube expands against the wall of the tire casing and the insulating core likewise expands to maintain such tube filled with the insulating material. It is noted that prior to the application of fluid under pressure to the curing tube, the insulating core 30 is of sufficient strength to support the walls of the tire casing and maintain such casing substantially centrally of the mold regardless of whether a horizontal or a vertical mold is used.

If desired, instead of cutting a slit 26 around the periphery of the curing tube 25, such tube may be cut transversely and the core 30 inserted in such transverse cut and pulled through the tube while in compressed condition.

As illustrated in FIG. 4, the substantially flat rim 28 may be replaced by a concave or vaulted rim 28', which would reduce the amount of air space within the curing tube 25. The rim 28' is substantially concentric with the interior of the casing 18 and the amount of air under pressure introduced into such curing tube is substantially reduced.

As illustrated in FIG. 5, instead of a core 30, the insulating material may be formed into a band 32 having tapered edge portions 33 and being bonded to the exterior of the curing tube 25. The band 32 will extend substantially the same distance about the periphery of the curing tube as the camelback cap extends about the tire casing. The band 32 may be constructed of cellular material such as that previously disclosed or it may be constructed of a more solid type of insulation such as asbestos or the like. When air is introduced into the tube 25 the insulating material of the band 32 will permit deformation, but will provide a barrier against the transfer of heat from the tire casing 18 to the curing tube 25.

In the operation of the device the camelback cap is applied to the tire casing, after which the curing tube is inserted within the tire casing and the rigid rim is inserted against the curing tube. The tire casing is then inserted in one mold portion of the matrix and the other mold portion is applied to seal the matrix. Air under pressure is then introduced through the air valve 27 into the curing tube to apply pressure against the interior of the tire casing and then heat in the form of live steam is introduced into the matrix through channels 14 and 15 to vulcanize the camelback cap to the tire casing. Since the loss of heat through dissipation to the atmosphere has been prevented or substantially reduced, the amount of time for the vulcanizing process is proportionately substantially reduced, since there is more efficient use of the available heat and subsequently the time required for the process is reduced.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for vulcanizing a cap to a tire casing comprising a pair of mold sections, tread forming projections on portions of each of said sections, means for applying vulcanizing heat to said mold sections, a circular curing tube having a flattened portion about its inner periphery, said curing tube being located within the tire casing in a position to apply pressure to the interior of said casing, means for introducing air under pressure into said curing tube, an annular rim disposed against the flattened portion of said curing tube to cause pressure to be exerted against the tire casing, and an insulating core of cellular material located within said curing tube to prevent the transfer of heat through said curing tube and annular rim.

2. Apparatus for use in the vulcanizing of a cap to a tire casing comprising a matrix, tread-forming projections on said matrix, means for applying vulcanizing heat to said matrix, a toroidal curing tube disposed within said casing, said toroidal curing tube having a generally semicircular outer periphery and a non-circular inner periphery in cross-section, means for introducing air under pressure into said curing tube, an annular rim having a cross-section corresponding to said inner periphery and disposed against the same to cause pressure to be exerted against the tire casing by said outer periphery, and an insulating core of cellular material located within and substantially filling said curing tube to prevent the transfer of heat through said curing tube and said annular rim.

3. The structure of claim 2 in which the inner periphery of said curing tube is generally flat.

4. The structure of claim 2 in which the inner periphery of said inner tube is concave.

References Cited by the Examiner

UNITED STATES PATENTS

| | | | |
|---|---|---|---|
| 1,353,383 | 9/20 | Dieser | 18—18 |
| 2,138,585 | 11/38 | Pilblad | 18—45 |
| 2,237,182 | 4/41 | Iknayan | 18—45 |
| 2,869,180 | 6/59 | Fassero et al. | 18—18 |
| 2,970,344 | 2/61 | Morris | 18—45 |

MICHAEL V. BRINDISI, *Primary Examiner.*